United States Patent
Davies

(10) Patent No.: US 9,331,626 B2
(45) Date of Patent: May 3, 2016

(54) GENERATING HEAT IN A MOVABLE BARRIER OPERATOR

(71) Applicant: The Chamberlain Group, Inc., Elmhurst, IL (US)

(72) Inventor: Michael Joseph Davies, Villa Park, IL (US)

(73) Assignee: The Chamberlain Group, Inc., Elmhurst, IL (US)

(*) Notice: Subject to any disclaimer, the term of this patent is extended or adjusted under 35 U.S.C. 154(b) by 66 days.

(21) Appl. No.: 14/176,696

(22) Filed: Feb. 10, 2014

(65) Prior Publication Data

US 2015/0229260 A1 Aug. 13, 2015

(51) Int. Cl.
*H02P 3/00* (2006.01)
*H02P 29/00* (2016.01)
*E05F 15/60* (2015.01)
*H02P 3/12* (2006.01)
*H02P 6/24* (2006.01)

(52) U.S. Cl.
CPC .............. *H02P 29/005* (2013.01); *E05F 15/60* (2015.01); *H02P 29/0044* (2013.01); *E05Y 2800/414* (2013.01); *E05Y 2900/106* (2013.01); *E05Y 2900/40* (2013.01); *H02P 3/12* (2013.01); *H02P 6/24* (2013.01)

(58) Field of Classification Search
CPC .............. H02P 3/12; H02P 6/24; H02P 3/22; B60L 2200/26; B60L 7/22
USPC ......................................... 318/375
See application file for complete search history.

(56) References Cited

U.S. PATENT DOCUMENTS

| | | | |
|---|---|---|---|
| 2,487,326 A | 11/1949 | Freeman | |
| 4,395,670 A | 7/1983 | Podell | |
| 6,194,851 B1* | 2/2001 | Denault | E05F 15/643 318/139 |
| 6,940,240 B2* | 9/2005 | Kelkhoff | E05F 15/41 318/282 |
| 7,138,912 B2* | 11/2006 | Fitzgibbon | E05F 15/72 160/7 |
| 7,312,592 B2 | 12/2007 | Maslov | |
| 8,084,984 B2* | 12/2011 | Lu | H02P 29/0055 318/432 |
| 8,100,106 B2 | 1/2012 | Kardos | |
| 2014/0117757 A1* | 5/2014 | Tsui | E05F 15/681 307/23 |

OTHER PUBLICATIONS

Toshiba, "Low Voltage ASD Application Note," 2011, http://www.toshiba.com/ind/data/tag_files/9.0_H9_DC_Injection_Braking_6551.pdf.
DC Injection Braking, Wikipedia, printed Oct. 8, 2013, http://en.wikipedia.org/wiki/DC_injection_braking.
Block Heater, Wikipedia, Printed Oct. 8, 2013, http://en.wikipedia.org/wiki/Engine_block_heater.

(Continued)

*Primary Examiner* — Kawing Chan
*Assistant Examiner* — Bradley Brown
(74) *Attorney, Agent, or Firm* — Fitch, Even, Tabin & Flannery LLP

(57) ABSTRACT

A movable barrier operator apparatus having a motor and a control system is disclosed. The motor is configured to couple to a movable barrier. The control system is configured to cause the motor to move the movable barrier by supplying power to the motor. The control system is further configured to selectively supply nonoperational power to the motor to generate heat without moving the movable barrier.

26 Claims, 4 Drawing Sheets

(56) References Cited

OTHER PUBLICATIONS

Chamberlain Elite Owner's Manual, CSW 200 UL (TM), Vehicular Swing Grate Operator, 2009.

Liftmaster Model G6518 CW Heater Kit for Swing Gate Operators, Printed Oct. 8, 2013, http://www.pssstore.net/ProductDetails.asp?ProductCode=liftmaster-g6518csw&Click=71&utm_source=googlebase&utm_medium=shoppingengine&gclid+CMmM4Kjum7kCFfE-Mgod7wsAjQ.

Heater Kits, Door King-Access Control Solutions, printed Oct. 8, 2013, http://www.doorking.com/gate-operators/accessories/heater-kits.php.

Viking F-1 Gate Operaotr/Swing Gate Operator, pritned Oct. 28, 2013, http://www.gatesnferences.com/Viking-Access-Openers/VikingAccess-F1Commercial-GateOpener.html.

Linear Factory Option 2500-2116: Heater (115v), printed Oct. 8, 2013, http://lineargateopeners.com/store/linear-2500-2116-heater-115v-sl-and-sw-series-models-only.html.

* cited by examiner

GENERATING HEAT IN A MOVABLE BARRIER OPERATOR

TECHNICAL FIELD

The present invention relates generally to moveable barrier operators, and more specifically to a self-heating movable barrier operator.

BACKGROUND

Various access control mechanisms are known, including, but not limited to, single and segmented garage doors, pivoting and sliding doors and cross-arms, rolling shutters, and the like. In general, an operator system for controlling such movable barriers includes a primary barrier control mechanism coupled to a corresponding barrier and configured to cause the barrier to move (typically between closed and opened positions).

Many such movable barrier operator systems are situated outdoors and/or in areas without thermal control and are susceptible to malfunctions due to harsh weather conditions. In extreme cold environments, components of a movable barrier operator system may freeze or be rendered less effective. For example, the oil in the gear reduction mechanism can freeze and cease to effectively reduce friction at cold temperatures. Low temperatures may also reduce the capacity of the battery in the movable barrier operator.

Conventionally, a dedicated heating element is added to movable barrier operators to maintain the temperature of the components of the movable barrier operator in cold climates. However, dedicated heating elements are costly and are usually used only when absolutely needed.

SUMMARY

Methods and apparatus for a heating a movable barrier operator are described wherein. One example apparatus includes a motor and a control system that can control the motor to both actuate a movable barrier and generate heat when needed. The control system selectively supplies nonoperational power to the motor to cause the motor to generate heat without generating sufficient torque to move the movable barrier. For example, DC power or AC power having a frequency in a range separate from a frequency range sufficient to drive the AC motor may be applied to an AC motor as nonoperational power. Alternatively, AC power above a range that would cause jitter in a DC motor may be supplied to a DC motor as nonoperational power. The motor for moving the movable barrier can thus be used to increase the temperature of the movable barrier operator system without a dedicated heating element. The nonoperational power may be selectively supplied based on the temperature detected by a temperature sensor to conserve energy when heating is not needed. The nonoperational power may also be selectively supplied based on the state of the movable barrier operator to avoid interfering with the normal operation of the motor.

This system has several advantages over a system with a dedicated heating element. First, the cost of the system is reduced by using existing components of a movable barrier operator to generate heat. Second, because the motor has a large surface area, the temperature of the motor generally does not need to reach as high of a temperature as a conventional dedicated heating element to bring components of the operator system to a desired temperature. Third, the motor is often positioned for more efficient heat transfer by being physically coupled, directly or indirectly, to components that require heat, such as the gear reduction mechanism. These and other benefits may be clearer upon making a thorough review and study of following detailed description.

Figure 1:
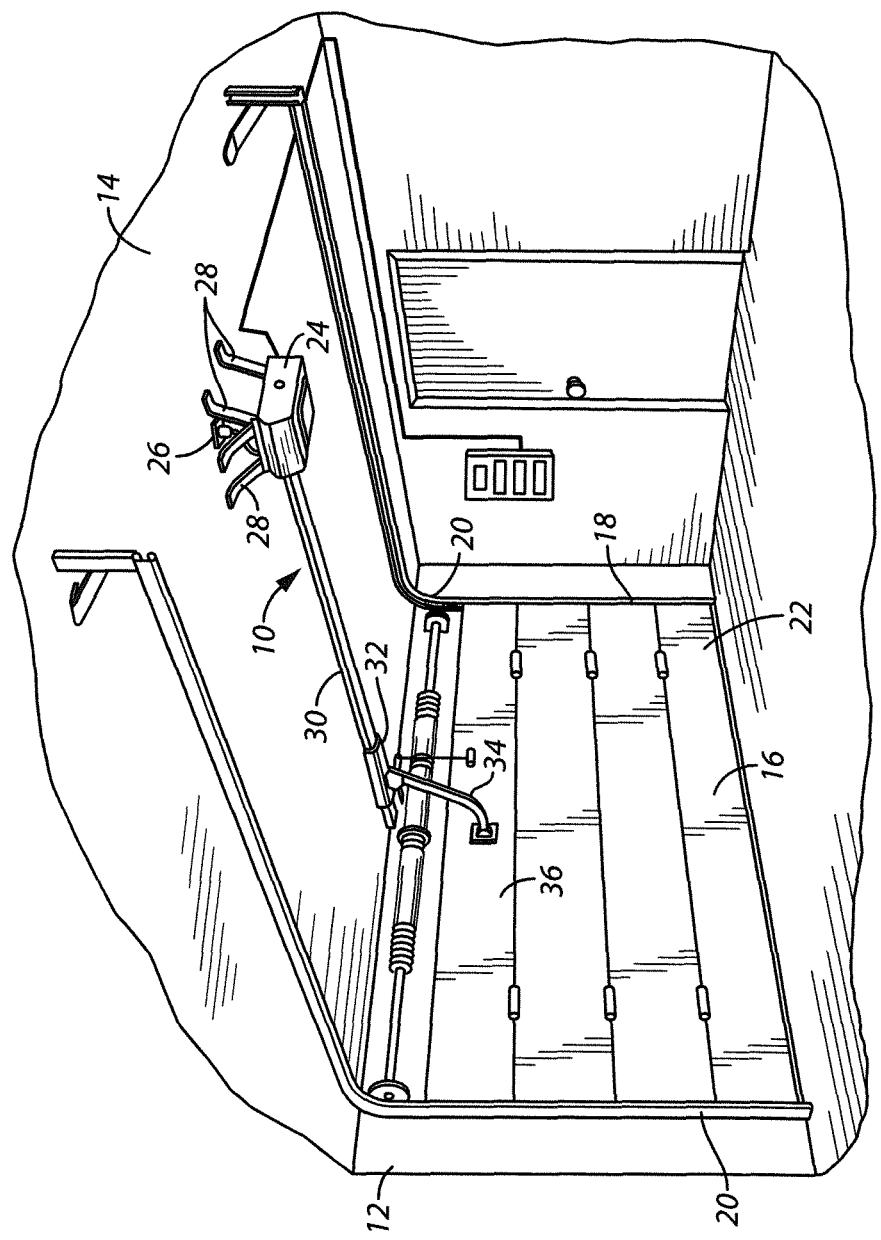
FIG. 1 is a perspective view of a garage having mounted within it a garage door operator in accordance with one or more embodiments of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will be further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. The scope of the invention should be determined with reference to the claims. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

First referring to FIG. 1, a movable barrier operator 10 according to some embodiments is shown. The movable barrier operator 10 is configured to control movement of the movable barrier 16 between a first position and a second position. In the embodiment shown in FIG. 1, the movable barrier operator 10 is mounted to a ceiling 14 of the garage 12 for actuating the movable barrier 16. The movable barrier 16 shown is a multipanel garage door having a plurality of rollers 18 that ride within a pair of tracks 20 positioned adjacent to and on opposite sides of a garage opening 22.

In the embodiment shown in FIG. 1, the movable barrier operator 10 also includes a head unit 24 for providing motion to the movable barrier 16 via a rail assembly 30. The head unit 24, which includes control circuitry and an electric motor, is powered from a mains voltage outlet 26 and is supported from the joists of the ceiling by support members 28. Alternatively, the head unit 24 may be powered by a battery. In some embodiments, the head unit 24 includes a housing that encloses one or more of a control circuitry, a motor, a gear reduction mechanism, and a battery. The motor within the head unit 24 is configured to actuate the movement of the movable barrier 16. The rail assembly 30 includes a trolley 32 for releasable connection of the head unit 24 to the movable barrier 16 via an arm 34. The arm 34 is connected to an upper portion 36 of the movable barrier 16 for opening and closing it. The trolley 32, connected to a drive chain, is driven thereby. In some embodiments, the chain is driven by a sprocket in the head unit 24. In such a configuration, the sprocket acts as a power takeoff for an electric motor located in the head unit 24.

The movable barrier operator shown in FIG. 1 is provided as an example only. In other embodiments, movable barrier operator may be operators for single and segmented garage doors, pivoting and sliding doors and cross-arms, rolling shutters, and the like. The head unit 24 including a motor may also be installed at different locations depending on the operation of the movable barrier. For example, the head unit 24 may be located on the floor, mounted to a side wall, mounted on the movable barrier itself, etc. The head unit including the motor may further be situated indoor or outdoor depending on the particular embodiment.

Figure 2:
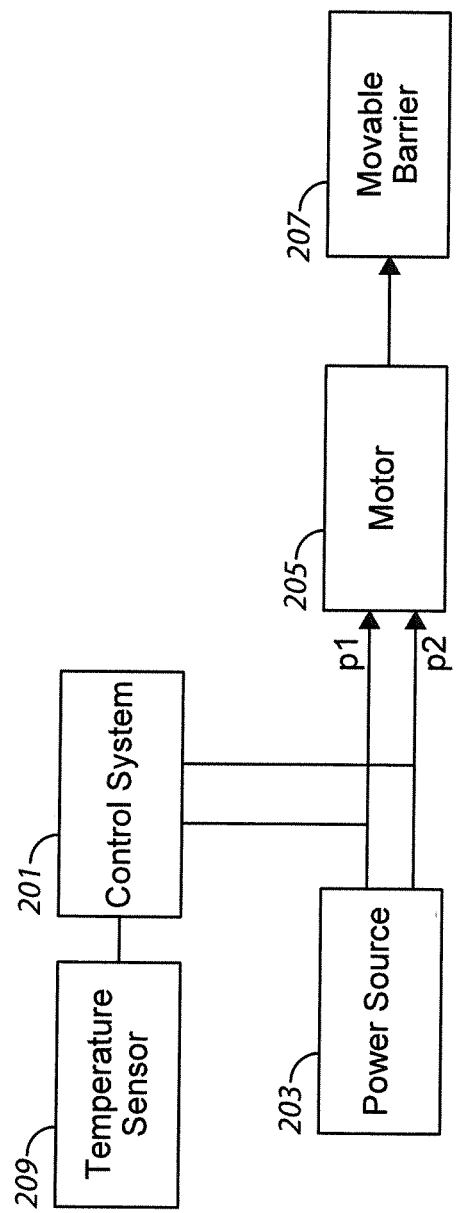
FIG. 2 is a block diagram of a self-heating movable barrier operator system in accordance with one or more embodiments of the invention.

Next referring to FIG. 2, a block diagram of a movable barrier operator system according to some embodiments is shown. The system shown in FIG. 2 includes a control system 201, a power source 203, a motor 205, a movable barrier 207, and a temperature sensor 209. The control system 201 is operatively coupled to the power source 203 and the motor 205 to selectively supply operational power p1 and nonoperational power p2 to the motor 205. Although illustrated as different lines in this conceptual figure, both the operational power and non-operational power may be supplied over the same electrical inputs to the motor 205. The control system 201 is further coupled to a temperature sensor 209 for receiving a temperature reading. The operational power p1 supplied to the motor 205 generates torque to actuate the movable barrier 207.

The control system 201 will typically include structure for receiving a status change request, such as a request to move, open, or close the barrier. Such structure can include an RF receiver, a wired connection, a network connection, and the like, all of which are known in the art and need no further description herein. In response to the control system's 201 receiving a status change request, it may cause the motor 205 to open or close the movable barrier 207 by supplying operational power p1 to the motor 205. The control system 201 may further include memory storage for storing various user configurable settings described herein. The control system 201 in one approach is operatively coupled to the temperature sensor 209 to measure the temperature of the surrounding area. The temperature sensor 209 is preferably located within the motor's 205 housing to provide a more accurate temperature reading of the motor's internal components, although the sensor 209 may be located outside the housing in a given application. Alternatively, the control system 201 receives temperature information through a data network such as the Internet or a local network connection. In one such approach, the temperature information may be relayed to the control system 201 via a wired or wireless local network connection to the temperature sensor 209. In another approach, local temperature information may be pulled from a general Internet source or via an Internet connection to the locally placed temperature sensor 209. The functions of the control system 201 described herein may be implemented with hardware circuitry, software modules, or a combination of the two.

In another approach, the temperature sensor 209 includes circuitry configured to measure a resistance of a winding of the motor 205 and determine temperature based on the resistance. Because the electrical resistance of conductors varies with temperature in a largely linear fashion, the relative temperature of the motor winding can be determined if the resistance and the temperature coefficient of the winding material is known. To measure winding resistance, the temperature sensor 209 is configured to momentarily inject a precise DC current into the motor in a stop state while measuring the voltage across the windings. With known voltage and current, motor winding resistance can be calculated using Ohms Law (Voltage/Current=Resistance). The change in winding temperature ($\Delta T$) can then be determined based on the change in winding resistance ($\Delta R$) and the temperature coefficient ($\alpha$) of the winding material with the following equation: $\Delta R/R_0 = \alpha \Delta T$. Temperature coefficient represents the relative change of resistance of a material per degree of temperature. Two common materials for motor windings, copper and aluminum for example, have temperature coefficients 0.0043 and 0.00429 (resistivity/C) respectively. In some embodiments, the circuitry may be calibrated at a known temperature to derive a set of reference resistance and temperature values, from which an absolute temperature of the winding can be determined. In one configuration, the temperature sensor 209 calculates the relative and/or absolute temperature based on the measured resistance, and outputs a temperature value to the control system 201. In another configuration, the temperature sensor 209 provides the resistance, current, and/or voltage value(s) to the control system 201, and winding temperature is calculated at the control system 201. In some cases, the temperature sensor 209 may only need to provide a voltage value to the control system 201, which then calculates resistance and temperature based on the known DC injection current value and winding material temperature coefficient. In one example implementation, the components that inject DC power to the motor for heating and braking the motor 205 can be used to inject DC current periodically for measuring winding resistance. By utilizing the temperature coefficient of the winding material, winding temperature can be determined using a resistance measuring circuitry and associated programming (which can be implemented either as separate circuitry as illustrated in FIG. 2 or combined with the control system 201) as the temperature sensor 209 without the use of a separate temperature sensing element.

The power source 203 may be a power outlet, a generator, a battery, and the like. The power source 203 may be an AC power source or a DC power source and may be internal or external to the movable operator system. In some embodiments, the power source 203 may further include a AC to DC converter and/or a DC to AC converter. In some embodiments, power from a single power source provides both the operational power p1 and nonoperational power p2 through the use of power converters. For example, power from an AC power source may be supplied to an AC motor as operational power while an AC to DC converter may convert AC power into DC power to be used as nonoperational power in the system to generate heat using the AC motor. While only one power source is shown, it is understood that the system may include multiple power sources. For example, the system may include a battery and receive power from an AC power outlet. In some embodiments, separate power sources provide operational power p1 and nonoperational power p2.

The motor 205 is configured to actuate and change the position of the movable barrier 207. The motor 205 may be an AC motor or a DC motor. In some embodiments, the motor 205 is an AC induction motor and is configured to impede the movement of the movable barrier with dynamic DC injection braking. In some embodiments, the motor 205 is located in the same housing as at least one of the control system 201, the temperature sensor 209, the power source 203, and a gear reduction mechanism (not shown).

The movable barrier 207 may be any person or vehicle barrier such as a garage door, a gate arm, a sliding gate, a roll up door, and the like. The movable barrier 207 is typically configured to move between at least two positions, such as open and closed, by the motor 205. The control system 201 may operate one or more motors 205, and a motor 205 may be configured to actuate one or more movable barriers 207.

In operation, when the control system 201 receives a status change request, it causes operational power p1 to be supplied from the power source 203 to the motor 205. As used in this document, "operational power" refers to power configured to generate sufficient torque in the motor to cause the movable barrier to move between at least two positions. For example, for an AC motor, operational power is AC power having amplitude and frequency that is within a range that actuates the motor. For a DC motor, operational power is DC power within an amplitude range that actuates the motor. When operational power p1 is applied to the motor 205, the motor generates torque and moves the movable barrier 207.

In addition to operating the movable barrier 207, the control system 201 is further configured to cause the motor 205 to generate heat without moving the movable barrier 207 by supplying the motor 205 with nonoperational power p2. For example, when the control system 201 detects that the temperature reading from the temperature sensor 209 falls below a certain threshold temperature, the control system causes nonoperational power p2 to be supplied to the motor 205. In some embodiments, the temperature threshold may be freezing, i.e., 0° C., a temperature at or above the pour point (the highest temperature at which a liquid becomes semi solid and loses its flow characteristics) for the oil used in the given movable barrier operator, or a user configurable setting.

Nonoperational power p2 refers to power that causes the motor 205 to generate heat but does not cause the motor 205 to move the movable barrier 207. For example, for an AC motor, nonoperational power may be DC power, AC power having a frequency substantially outside of the frequency range of the motor's operational power, and/or AC power with a strong DC component. For a DC motor, nonoperational power may be DC power below a minimum voltage threshold. Nonoperational power for a DC motor may also be AC power having a frequency above a threshold to avoid jitter in the DC motor. That is, the frequency of the nonoperational AC power does not cause a variation in motor signal that leads to vibration of the DC motor.

In some approaches, the nonoperational power p2 serves other functions in the system. For example, in embodiments using an AC motor, the nonoperational power p2 may be DC injection power applied to cause dynamic braking of the motor to impede the movement of the movable barrier 207. In one example, if the detected temperature is below a predetermined threshold, the DC injection power is applied while the barrier 207 is not moving, removed when the motor begins to move the barrier 207, and applied again during movement of the barrier to apply dynamic braking during the course of barrier movement. The control system may continue to supply nonoperational power p2 to the motor 205 after the movable barrier 207 comes to a complete stop to further heat the system. For instance, nonoperational power p2 can be continuously supplied for one second or longer for heating purposes after the movable barrier stops and the motor transitions to a stop state.

In certain embodiments, the control system 201 further monitors the status of the movable barrier 207 and only applies the nonoperational power p2 when the movable barrier is in a stop state. Stop state refers to a state when the movable barrier 207 is not actively actuated by the motor 205. The movable barrier may be in an open, closed, or semi-open position in a stop state.

Typically, the control system 201 terminates the supply of nonoperational power p2 to the motor 205 in response to the detected temperature's reaching or being above a threshold. For example, the control system 201 may terminate nonoperational power when the sensed temperature reaches 5 degrees Celsius.

The application of the heating can be arranged in a variety of ways. In one example, the heating is stopped after a certain time period (e.g., 10 minutes) and restarted after a given time if the temperature is then below a given threshold. In other examples, heating may be prevented and/or disabled based on a schedule. For instance, heating may be disabled after midnight or outside of business hours, regardless of temperature. In still another example, the control system 201 may supply the nonoperational power p2 to the motor 205 based on instructions received from a user. For instance, the parameters of any of the above examples could be adjusted by a user. In another example, a user may access the control system 201 via a network prior to returning home to turn on the heating function. In other examples, the controller can be configured to anticipate the use of the movable operator based on time, user's location, historical usage data, and the like to determine when to enable the heating feature. Any combination of the above heating application methods can be used as well.

Figure 3:
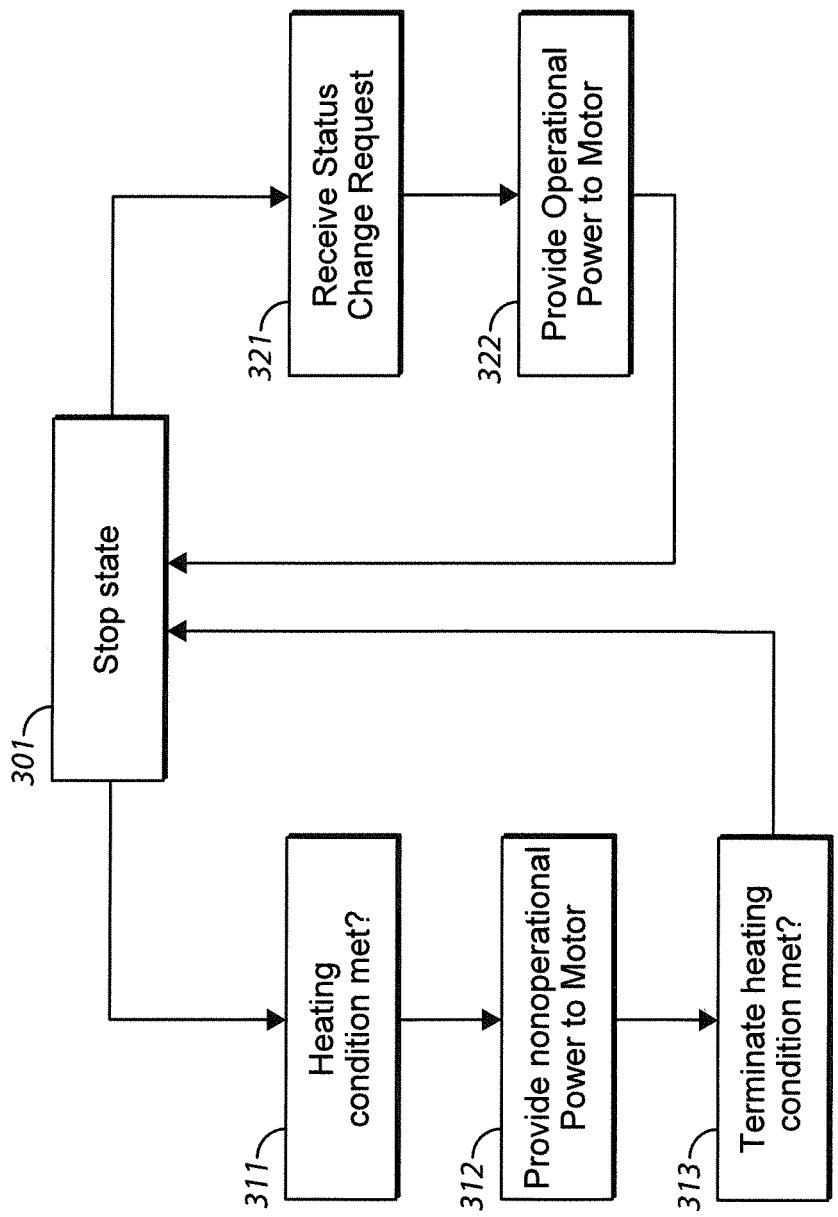
FIG. 3 is a flow diagram of a method for heating a movable barrier operator in accordance with one or more embodiments of the invention.

Next referring to FIG. 3, a flow diagram of an example process for heating a movable barrier operator is shown. In step 301, the movable barrier operator begins in a stop state. The movable barrier may be in an open, closed, or semi-open position while the motor is in a stop state. In the stop state 301, the motor is not powered to generate torque to move the movable barrier. Various monitoring processes may be active in the movable barrier controller system while the motor is in a stop state. For example, a controller may monitor the temperature through a temperature sensor and monitor for a status change request from a local or remote control. In step 311, if the controller determines that the heating condition has been met, the controller proceeds to step 312.

The heating condition may take into account a number of factors. In the first instance, the heating condition includes a temperature reading below a temperature threshold, such as below freezing, e.g., 0 degrees Celsius, or the pour point for an oil used in the movable barrier operator system. The temperature threshold may be user configurable, and other variables such as time of day and/or status of the movable barrier may be considered as part of the heating condition. For example, heating may only be triggered during business hours and/or when the movable barrier is stopped. In some embodiments, the heating condition may be a combination of temperature, time, movable barrier status, and/or user setting. For example, heating condition may only be met if the temperature falls below a threshold during business hours on a weekday and while the movable barrier is stopped. In a different approach, heating is manually controlled by a user. For example, the user may operate a switch, locally or remotely, to manually trigger heating, for example, in anticipation of operation of the movable barrier. Such manual operation may be done regardless of other factors or such manual operation may simply enable heating in response to consideration of the other factors. Any combination of the above heating application methods may be applied.

When the heating condition is met in step 311, the controller provides nonoperational power to the motor in step 312. While the controller supplies nonoperational power to the motor, the controller may monitor for a terminate heating condition in step 313. A terminate heating condition may be one or more of temperature, time, movable barrier status, and/or user input as described above, for example, where one of the conditions used to trigger the heating operation is no longer present. For instance, heating stops when the temperature sensor senses a temperature reading above a certain threshold or when a predetermined period of time has lapsed. In other approaches, heating may be manually stopped by a user. When the terminate heating condition is met, the process may return to the stop state 301 in which the system again monitors for a heating condition.

While receiving status change request 321 is shown as a separate step in FIG. 3, in some embodiments, the receiving of a status change request may be a terminate heating condition in step 313. For example, when the controller receives a status change request, heating may terminate and the process may proceed to step 321. In some approaches, receiving a status change request during steps 312 "pauses" the heating process. Heating may automatically resume after the status change request is completed and continues until a terminate heating condition is met in step 313. In other approaches, nonoperational power may be continuously supplied to the motor before, during, and after operational power is supplied to the motor to change the position of the movable barrier.

The controller may receive a status change request at step 321. A status change request may be a signal from a local or remote control received through a wired connection, a short-range radio frequency signal, and/or through a network connection as known in the art. A status change request generally refers to a signal requesting a change in the position and/or the direction of movement of the movable barrier. When the controller receives a status change request at step 321, the controller may determine whether to power the movable barrier open or close based on the current position of the movable barrier. At step 322, the controller provides operational power to the motor to move the movable barrier. Operational power generally refers to power configured to cause the motor to move the movable barrier between at least two positions such as open and closed. For example, for an AC motor, operational power is AC power having amplitude and frequency that is within a range that generates sufficient torque to actuate the motor and move the barrier. For a DC motor, operational power is DC power within an amplitude range that actuates the motor and moves the movable barrier.

In some approaches, the controller continues to monitor for a heating condition during steps 321 and 322. If the heating condition is met while the movable barrier is in motion, in some approaches, the controller may wait for the status change request to be completed before providing nonoperational power to the motor. That is, the controller would first determine that the movable barrier has reached either a closed or open position and terminate the supply of operational power prior to providing nonoperational power to the motor. In other approaches, the controller may also determine that that the movable barrier stopped in a semi-open position and begin to provide nonoperational power. In other embodiments, nonoperational power may be supplied during steps 321 and 322 without interfering with the actuation of the movable barrier. That is, in some embodiments, once the heating condition is met, nonoperational power is supplied to the motor regardless of the state of the movable barrier and motor.

In some embodiments, nonoperational power may be supplied in addition to the operational power at step 322 to impede the movement of the movable barrier. For example, for an AC motor, DC injection may be applied to cause dynamic braking to slow down the movable barrier as it comes to a stop. In such cases, if a heating condition is present during step 322, the nonoperational power supplied to impede the movement of the movable barrier may continue to be supplied to the motor after the movable barrier comes to a complete stop and the operational power terminates. That is, the DC injection power would be supplied for a prolonged period of time after the termination of the operational power to cause the motor to generate heat without further affecting the movement the movable barrier.

While FIG. 3 shows steps 311-313 and steps 321-322 as processes beginning at a stop state 310, it is understood that during steps 311-313, the controller may continue to monitor for incoming status change requests. When a status change request is received during step 312, heating may be paused or terminated. During steps 321-322 the controller may also continue to monitor for heating condition and additional status change requests. For example, during step 322, the controller may detect another status change request to stop the movable barrier or reverse the direction of the movable barrier's movement. When heating condition is detected during step 322, heating may begin immediately or begin when the movable barrier enters a stop state.

Figure 4:
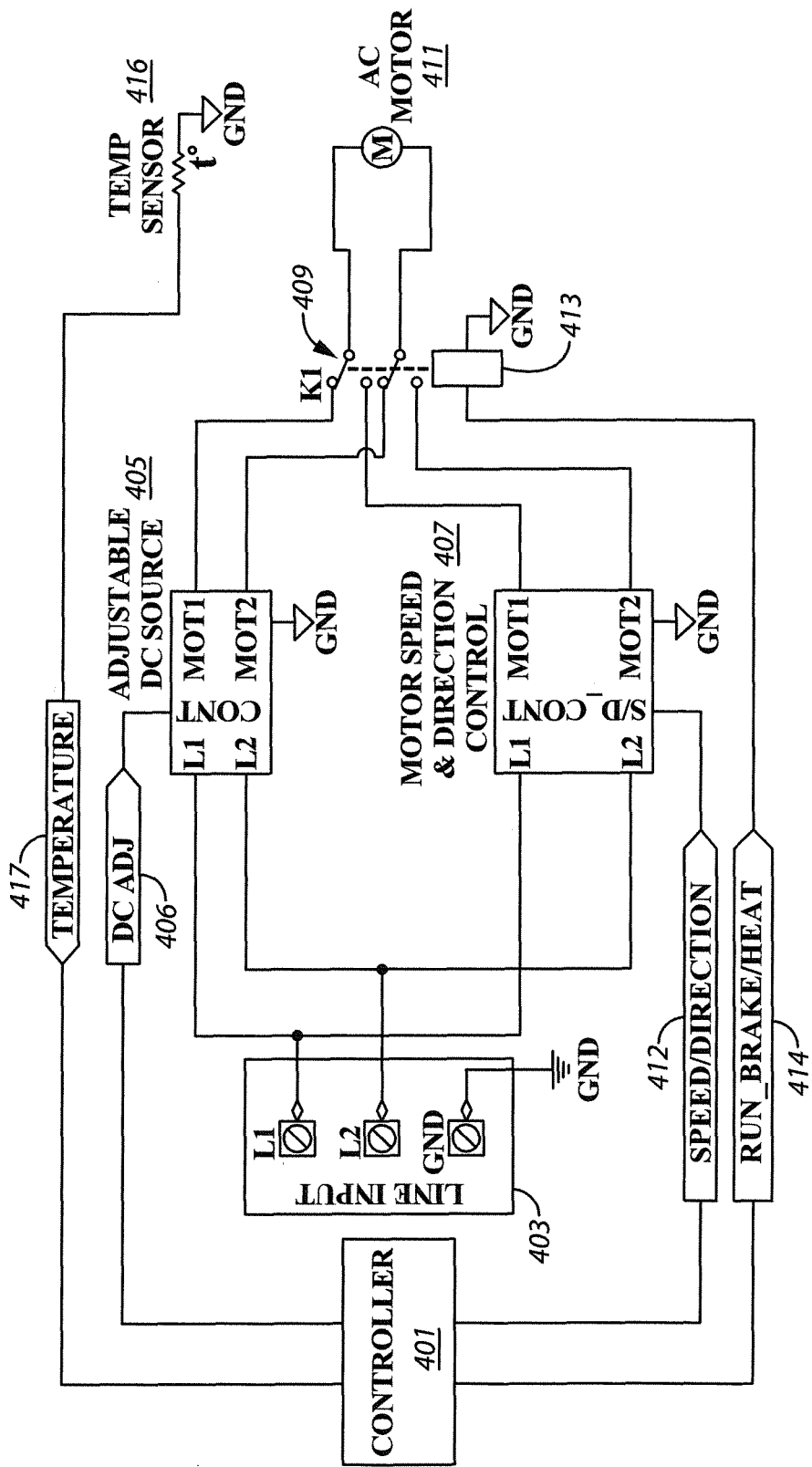
FIG. 4 is a block diagram of a self-heating movable barrier operator system with an AC motor in accordance with one or more embodiments of the invention.

Next referring to FIG. 4, a block diagram of a self-heating movable barrier operator system with an AC motor in accordance with one or more embodiments of the invention is shown. The system includes a controller 401, a power source 403, an adjustable DC source 405, a motor speed and direction control 407, a switch 409, an AC motor 411, and a temperature sensor 416. The controller 401 is configured to control the adjustable DC source 405, the motor speed and direction control 407, and the switch 409, for example, based on a received movable barrier status change request signal (not shown) and/or a temperature reading from the temperature sensor 416.

The power source 403 may be a battery or an AC power outlet connected to a power grid and/or a power generator. In the example of FIG. 4, the power source 403 includes lines L1 and L2 that provide input power and a ground line GND. The adjustable DC source 405 is electrically connected to the power source 403 lines L1 and L2 to receive power and is configured to convert that power to output a DC power determined in response to the DC_ADJ signal 406 received from the controller 401. For example, the controller 401 can send a signal with data to set the DC voltage output by the adjustable DC source 405. The adjustable DC source 405 may include an AC to DC converter and other components for producing adjustable DC source using inputs from the power source 403. In some embodiments, the adjustable DC source is configured to vary the outputted DC power in real time such that the DC power applied for braking and heating can be modified and applied responsively to the control signal received from the controller 401. Adjustable DC power sources are known and available and need no further description. While an adjustable DC source is shown, a fixed DC source may also be used in a self-heating movable barrier operator discussed herein.

The motor speed and direction control 407 is configured to output AC power to the AC motor 411. Like the adjustable DC source 405, the motor speed and direction control 407 is electrically connected to the power source 403 lines L1 and L2 and is configured to convert that power into an AC power used to actuate the motor 411. The motor speed and direction control 407 is configured to modify the amplitude and/or the frequency of the output AC power to change the speed of the motor 411 in response to a speed/direction control signal 412 received from the controller 401. The direction of the motor 411 may be changed by reversing the polarity of the output AC power provided to the motor 411. Motor speed and direction control devices such as the one described herein are known and available and need no further description.

The switch 409 is controlled by switch controller 413 based on a Run-Brake/heat signal 414 received from the controller 401. The switch 409 of this example electronically couples the AC motor 411 to either the adjustable DC Source 504 or the motor speed and direction control 407. Optionally, the switch controller 413 automatically controls the switch 409 to electrically couple the adjustable DC Source 405 to the AC motor 411 when the motor 411 is not otherwise being actuated to move a barrier. With the motor 411 is to be actuated to move the barrier, the controller 401 energizes the switch 409 close to allow the AC motor 411 to receive power from and thus be operated by the motor speed and direction control 407.

The AC Motor 411 in this example is an AC induction motor that is capable of braking by applying DC through its windings. The AC motor may be a single phase or three phase AC motor. The AC motor 411 is connected to actuate a movable barrier in at least two directions and impede the movement of the movable barrier depending on the input voltage.

In operation, when the controller 401 receives a status change request, it determines which direction the movable barrier should be moved. The controller 401 then sends a speed/direction signal 412 to the motor speed and direction control 407 and a run signal 414 to the switch 409/switch controller 413. The switch 409 then closes to electrically couple the motor speed and direction control 407 to the AC motor 411 to power and control operation of the motor 411. The controller 401 may change the speed/direction signal 412 based on the current position of the movable barrier. While the movable barrier is in motion, the controller 401 may determine that the speed of the movable barrier should be reduced. In such case, the controller 401 sends brake/heat signal to the switch 409/switch controller 413 and a DC_ADJ signal 406 to the adjustable DC source 405 to direct the DC power to be applied to the motor 411. The switch 409 electrically decouples the motor speed and direction control 407 from the AC motor 411 and couples the adjustable DC source 405 with the AC motor 411 for application of that DC power to brake the AC motor 411.

The controller 401 also monitors the temperature through receipt of temperature information 417 from the temperature sensor 416 to provide heating when needed. When the controller 401 detects a temperature below a threshold, it sends a brake/heat signal 414 to the switch 409 and a DC_ADJ signal 406 to the adjustable DC source 405. The switch 409 electrically couples the adjustable DC source 405 to the AC motor 411 to supply DC power to the windings of the AC motor 411, which generates heat until the desired temperature is reached. The temperature sensor 412 may be placed to measure the temperature of the motor 411, ambient temperature, or the temperature of one or more other surrounding components of the movable barrier operator. The controller 401 stops the heating process by stopping the supply DC power from the adjustable DC source 405 through the DC_ADJ signal 406 and/or by operating the switch 409 to decouple the adjustable DC source 405 from the AC motor 411.

While the temperature sensor 416 is shown as a thermistor type sensor, in some embodiments, the temperature sensor 416 may provide temperature information 417 by measuring the winding resistance of the AC motor 411. The temperature sensor 416 may cause a DC current to be supplied from the adjustable DC source 405 to the AC motor 411 and measure the voltage across the motor winding to determine the winding resistance. The temperature of the winding is then calculated using the measured resistance and the known temperature coefficient of the winding material.

The block diagrams shown in FIGS. 2 and 4 are simplified diagrams. Specific components depicted in the block diagrams may be interchanged with other components providing similar functionalities without departing from the scope of the present disclosure. For example, the switch 409 is illustrated as a double pole switch although other switching arrangements are possible. Moreover, FIG. 4 illustrates the adjustable DC source 405 and motor speed and direction control 407 as separate chips event though they may be combined together and/or with the controller 401 circuitry.

So configured, such a motor arrangement uses existing components to heat a movable barrier operator without a separate dedicated heating element. Such systems and methods can reduce the cost of manufacturing and maintaining a movable barrier operator that is operable in cold climates. Due to the relatively large surface area of the motor in movable barrier operator systems, the temperature of the motor generally does not need to be as high as a dedicated heating element to bring components of the operator system to the desired temperature. Furthermore, motors in a movable barrier operator are often positioned for more efficient heat transfer by being physically coupled, directly or indirectly, to components that require heat, such as the gear reduction mechanism. With the responsive heating provided by the controller and the motor of a movable barrier operator, various malfunctions associated with operating a movable barrier in low temperature may be prevented thereby increasing the overall reliability of movable barrier operators.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A movable barrier operator apparatus comprising:
a motor configured to couple to a movable barrier;
a control system configured to cause the motor to move the movable barrier by supplying power to the motor; and a temperature sensor separate from the motor and operatively coupled to the control system and configured to detect a temperature of the motor or its surrounding area;

wherein the control system is further configured to selectively supply nonoperational power to the motor to generate heat in a stop state without moving the movable barrier when the temperature sensor detects a temperature below a predefined threshold associated with a temperature at which a liquid in a movable barrier operator system including the motor loses flow characteristics.

2. The apparatus of claim 1, wherein the control system is configured to supply nonoperational power to the motor after the motor has been in a stop state for a period of time.

3. The apparatus of claim 1, wherein the control system is configured to supply nonoperational power to the motor while the movable barrier is in motion to impede movement of the movable barrier.

4. The apparatus of claim 3, wherein the nonoperational power is supplied in addition to the power supplied to the motor to cause the movable barrier to move.

5. The apparatus of claim 1, wherein the control system is configured to continuously supply nonoperational power to the motor as the motor transitions from moving the movable barrier to a stop state.

6. The apparatus of claim 5, wherein the control system is configured to continuously supply nonoperational power to the motor if a detected temperature is below a threshold temperature.

7. The apparatus of claim 1, wherein the motor comprises an AC induction motor and the control system is configured to supply AC power having a frequency in a first range to the motor to cause the motor to move the movable barrier.

8. The apparatus of claim 7, wherein nonoperational power comprises at least one of DC power, AC power having a frequency substantially outside of the first range, or AC power with a strong DC component.

9. The apparatus of claim 7, wherein the control system is configured to supply DC power to the AC induction motor to impede movement of the movable barrier; and wherein the control system continues to supply DC power to the motor after the movable barrier comes to a stop to generate heat.

10. The apparatus of claim 1, wherein the motor comprises a DC motor and the nonoperational power comprises AC power having a frequency above a threshold to avoid jitter in the DC motor.

11. A method of heating a movable barrier operator, the method comprising:

determining a state of the movable barrier operator comprising a motor;

detecting a temperature of the motor or its surrounding area with a temperature sensor that is separate from the motor;

selectively, with a control system, supplying nonoperational power to the motor to generate heat without moving a movable barrier when the temperature sensor detects a temperature below a predefined threshold associated with a temperature at which a liquid in a movable barrier operator system including the motor loses flow characteristics; and moving the movable barrier by supplying operational power to the motor.

12. The method of claim 11 further comprising supplying the nonoperational power to the motor when the movable barrier operator is in a stop state.

13. The method of claim 11, further comprising the control system supplying nonoperational power to the motor after the motor has been in a stop state for a predetermined period of time.

14. The method of claim 11, further comprising the control system supplying nonoperational power to the motor while the movable barrier is in motion to impede movement of the movable barrier.

15. The method of claim 14, further comprising supplying the nonoperational power to the motor to impede the movement of the movable barrier in addition to the power supplied to the motor to cause the movable barrier to move.

16. The method of claim 11, further comprising continuously supplying nonoperational power to the motor as the motor transitions from moving the movable barrier to a stop state.

17. The method of claim 16, further comprising continuously supplying nonoperational power to the motor in response to detecting a temperature below a predetermined threshold.

18. The method of claim 11, wherein the motor comprises an AC induction motor and wherein the method further comprises the control system supplying AC current having a frequency in a first range to the motor to cause the motor to move the movable barrier.

19. The method of claim 18, wherein the nonoperational power comprises at least one of DC power, AC power having a frequency substantially outside of the first range, or AC power with a strong DC component.

20. The method of claim 18, wherein the control system is configured supply DC injection to the AC induction motor to impede movement of the movable barrier; and wherein the control system continues to supply DC power to the motor after the movable barrier comes to a stop to generate heat.

21. The method of claim 11, wherein the motor comprises a DC motor and the method further comprises providing the nonoperational power comprising AC power having a frequency above a threshold to avoid jitter in the DC motor.

22. A movable barrier operator apparatus comprising:

an AC motor configured to couple to move a movable barrier;

a temperature sensor separate from the AC motor and configured to detect a temperature of the AC motor or its surrounding area; and a control system;

wherein the control system is configured to cause the AC motor to move the movable barrier by supplying AC power to the motor; and wherein the control system is configured to selectively supply nonoperational power, comprising one of DC power or AC power having a frequency in a range separate from a frequency range sufficient to drive the AC motor, for the AC motor to generate heat in response to the temperature sensor detecting a temperature below a predefined threshold associated with a temperature at which a liquid in a movable barrier operator system including the motor loses flow characteristics.

23. The apparatus of claim 22, wherein the control system is further configured to monitor a state of the movable barrier and selectively supply nonoperational power to the motor when the movable barrier is in a stop state.

24. The apparatus of claim 22, wherein the control system is further configured to supply nonoperational power to the AC motor while the movable barrier is in motion to impede movement of the movable barrier.

25. A movable barrier operator apparatus comprising:
a DC motor configured to couple to move a movable barrier;
a temperature sensor separate from the DC motor and configured to detect a temperature of the DC motor or its surrounding area; and
a control system;
wherein the control system is configured to cause the DC motor to move the movable barrier by supplying DC power to the motor; and
wherein the control system is configured to selectively supply nonoperational power, comprising AC power having a frequency above a threshold to avoid jitter in the DC motor, for the DC motor to generate heat in response to the temperature sensor detecting a temperature below a predefined threshold associated with a temperature at which a liquid in a movable barrier operator system including the motor loses flow characteristics.

26. The apparatus of claim 25 wherein the control system is further configured to monitor a state of the movable barrier and selectively supply nonoperational power to the motor when the movable barrier is in a stop state.

\* \* \* \* \*